US008499312B2

(12) United States Patent
Naresh et al.

(10) Patent No.: US 8,499,312 B2
(45) Date of Patent: Jul. 30, 2013

(54) ADMINISTRATOR LEVEL ACCESS TO BACKEND STORES

(75) Inventors: Sundar Naresh, Redmond, WA (US); Serguei V. Martchenko, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1317 days.

(21) Appl. No.: 11/684,351

(22) Filed: Mar. 9, 2007

(65) Prior Publication Data

US 2008/0222153 A1   Sep. 11, 2008

(51) Int. Cl.
*G06F 9/54* (2006.01)

(52) U.S. Cl.
USPC .......................................... 719/330; 719/328

(58) Field of Classification Search
USPC .................................................. 719/328, 330
See application file for complete search history.

(56) References Cited

U.S. PATENT DOCUMENTS

| | | | |
|---|---|---|---|
| 6,571,245 B2 | 5/2003 | Huang et al. | 707/10 |
| 6,823,391 B1* | 11/2004 | Deen et al. | 709/229 |
| 6,898,633 B1* | 5/2005 | Lyndersay et al. | 709/226 |
| 6,978,461 B2* | 12/2005 | Shapiro et al. | 719/311 |
| 7,016,945 B2 | 3/2006 | Bellaton et al. | 709/219 |
| 2002/0143764 A1 | 10/2002 | Martin et al. | 707/8 |
| 2003/0126250 A1 | 7/2003 | Jhanji | 709/223 |
| 2003/0195862 A1 | 10/2003 | Harrell, Jr. | 707/1 |
| 2005/0039008 A1 | 2/2005 | Bhatia et al. | 713/170 |
| 2005/0188046 A1* | 8/2005 | Hickman et al. | 709/206 |
| 2006/0236313 A1 | 10/2006 | Bibr et al. | 717/168 |
| 2006/0288037 A1* | 12/2006 | Sundararajan et al. | 707/102 |
| 2007/0006285 A1* | 1/2007 | Stafie et al. | 726/4 |
| 2007/0088554 A1* | 4/2007 | Harb et al. | 704/257 |
| 2007/0162421 A1* | 7/2007 | Pang et al. | 707/2 |
| 2007/0264948 A1* | 11/2007 | Jansson et al. | 455/127.5 |
| 2008/0126486 A1* | 5/2008 | Heist et al. | 709/205 |

OTHER PUBLICATIONS

Walter J. Savitch, Absolute Java, 2nd Ed. (Apr. 18, 2005). pp. 198-216.*
Ron Ben Natan, Implementing Database Security and Auditing: A guide for DBAs, information security administrators and auditors (May 2, 2005). pp. 95-108, 177-201, 242-266, 278-293, 324-326, 340-391.*
Thuan Thai and Hoang Q. Lam, .NET Framework Essentials, 3rd Ed. (Aug. 11, 2003). pp. 124-126.*
Ray Lischner, C++ In A Nutshell (Apr. 1, 2003). pp. 109-111.*
Mike Heydon, Function to Determine MS SQL Server Version Number (Nov. 20, 2002) [retrieved from http://www.delphi3000.com/articles/article_3457.asp on Apr. 27, 2010].*
Gordon, A., "The .NET and COM Interoperability Handbook," (2003), Pearson Education, Inc., pp. 1-47, 89-204.*
Netscape Communications Corporation, "Messaging Access SDK Guide" (Jun. 3, 1998) [retrieved from http://docs.oracle.com/cd/E19957-01/816-6027-10/contents.htm]. pp. 1-88.*
Bertino, E. et al., "A Flexible Authorization Mechanism for Relational Data Management Systems", *ACM Transaction on Information Systems*, Apr. 1999, 17(2), 101-140.

(Continued)

*Primary Examiner* — H S Sough
*Assistant Examiner* — Brian W Wathen
(74) *Attorney, Agent, or Firm* — Woodcock Washburn, LLP (57) ABSTRACT

An API called AdminRPC written in managed code allows background applications written in managed code to access backend data stores. Functions within this API provide administrator level access to a mailbox or a public folder on a backend server.

19 Claims, 5 Drawing Sheets

OTHER PUBLICATIONS

Pereira, A. L. et al., "Role-Based Access Control for Grid Database Services Using the Community Authorization Service", *IEEE Transactions on Dependable and Secure Computing*, Apr.-Jun. 2006, 3(2), 156-166.

Managing the Complete Oracle Environment with Oracle Enterprise Manager 10g, *An Oracle White Paper*, Jan. 2004, 52 pages, http://www.oracle.com/technology/products/oem/pdf/WP_GENERAL_10g.pdf.

* cited by examiner

ADMINISTRATOR LEVEL ACCESS TO BACKEND STORES

BACKGROUND

As business becomes more competitive, the success of an organization increasingly depends on how quickly, smoothly, and efficiently people within that organization work together. The key to a successful organization is how well that organization manages and distributes information. Networking is an important part of teamwork because it enables fast and efficient information exchange. Organizations must also keep track of the information and manage its distribution. Electronic messaging systems provide these capabilities.

Electronic messaging has become critically important to enterprise computing. In fact, many organizations expect their electronic messaging systems to take on the role of a central communications backbone, used not only for electronic-mail (e-mail or email) messages, but to integrate all types of information. Electronic messaging provides a way for users in organizations to retrieve information from a variety of sources, to exchange information automatically, and to store, filter, and organize the information locally or across a network.

Today, powerful enterprise-wide workgroup applications that manage group scheduling, forms routing, order processing, and project management are built on electronic messaging systems. Hundreds of different messaging systems are offered by different vendors, (including Microsoft® Exchange, IBM® Lotus Notes®, IBM® Domino®, Novell® Groupwise®, SAP® R/3® Enterprise Software, Oracle® Interoffice™, Oracle® Collaboration Suite (OCS) and others) and a wide range of applications have been built to use them. These applications need to be able to access datastores created and maintained by the messaging systems.

SUMMARY

Middle-tier to backend, data access APIs written in managed code allow applications to access data stored in mailboxes and public folders. The APIs include methods that enable Administrator level access to contents of an entire database or server. These methods include enabling an Administrator level privileged connection to backend datastores, a method that creates an event manager object that can be used to enumerate events or changes that transpire on a specified backend server database and a method that can be used to read events that transpire on a specified backend server database.

DETAILED DESCRIPTION

Overview

The Microsoft .NET Framework is a software component written in managed code that provides a number of pre-coded solutions to common program requirements, and manages the execution of programs written for the framework, (hence the term "managed code"). Because interaction between new and older applications is commonly required, the .NET Framework provides means to access functionality that is implemented in code that is outside the .NET environment. The pre-coded solutions in the namespaces form the framework's class library and cover a large range of programming needs including data access and network communications.

Programs written for the .NET Framework execute in a software environment that manages the program's runtime requirements. This runtime environment, part of the .NET Framework, is known as the Common Language Runtime (CLR). The CLR provides the appearance of an application virtual machine, so that capabilities of the specific CPU that will execute the program do not need to be addressed. Programming languages on the .NET Framework compile into an intermediate language known as the Common Intermediate Language, or CIL. One implementation of CIL is known as the Microsoft Intermediate Language, or MSIL. MSIL may be compiled into native code in a manner known as just-in-time compilation (JIT) instead of being interpreted. Because the .NET Framework supports a Common Type System, or CTS that defines all possible datatypes and programming constructs supported by the CLR and how they may or may not interact with each other, the .NET Framework supports development in multiple programming languages.

As described herein, an API called StoreProvider written in managed code allows Administrator level access to backend data stores. Functions within this API, collectively referred to as AdminRPC functions are described herein and provide ways in which Administrator level access to the contents of an entire database or server can be provided. Hence these functions can be used, not by end-users but by other applications, agents, services and components within the messaging platform to access the backend datastores of a specified mail server and to determine what changes have occurred in the backend store so that appropriate actions can be taken by the other applications. Multiple applications can access the AdminRPC API, so that each individual application does not have to include this functionality. The functions described are related to processing of events transpiring asynchronously in the backend store. For example, suppose a new email is delivered to a user mailbox on a mail server. A content indexing application running in background on the mail server on which the mailbox resides, needs to know that the email was delivered to the user mailbox so that it can index the email so that the email can be displayed to the user when he accesses his mailbox. Similarly, a calendar application needs to know if a calendar appointment was delivered.

Exemplary Computing Environment

Figure 1A:
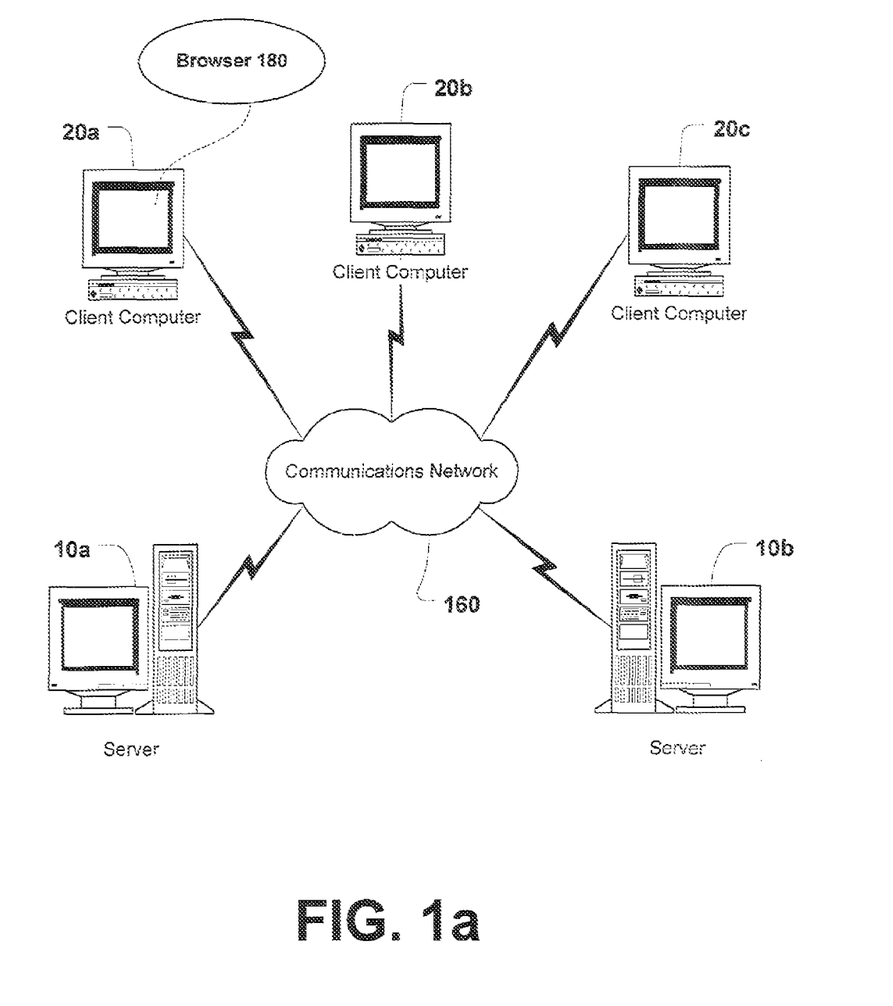
FIG. 1a is a block diagram representing an exemplary network environment in accordance with embodiments of the invention.

Embodiments of the invention may be deployed as part of a computer network. In general, the computer network may comprise both server computers and client computers deployed in a network environment. FIG. 1a illustrates an exemplary network environment, with a server in communication with client computers via a network, in which embodiments of the invention may be employed. As shown in FIG.

1a, a number of servers 10a, 10b, etc., are interconnected via a communications network 160 (which may be a LAN, WAN, intranet or the Internet, telephony or VoIP network) with a number of client computers 20a, 20b, 20c, etc. In a network environment in which the communications network 160 is the Internet, for example, the servers 10 can be Web servers with which the clients 20 communicate via any of a number of known protocols such as hypertext transfer protocol (HTTP). Each client computer 20 can be equipped with a browser 180 to gain access to the servers 10. In addition to using the network 160 in a client-server configuration, client computer 20a, 20b, 20c may communicate directly with each other in a peer-to-peer configuration.

Embodiments of the invention may be deployed in a network environment, where that network is an Internet or Intranet environment. The term "Internet" is an abbreviation for "Internetwork," and refers commonly to the collection of networks and gateways that utilize the TCP/IP suite of protocols, which are well-known in the art of computer networking. TCP/IP is an acronym for "Transport Control Protocol/Internet Protocol." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Electronic information transmitted by one of the common protocols (e.g., TCP/IP, UDP, etc.) is generally broken into packets. The packets are addressed to one of the other computers 20a, 20b, 20c, 10a, 10b connected to network 160. The addressed computer receives the packets, strips out the informational content of the packets, and reassembles the transmitted electronic information. The electronic information may be audio, video, text, mixed media and so on.

A transmission of data can be sent by a client application program to a server or to another client, depending on the system configuration. If the data is transmitted to a server, the server may transmit this data to another client application program. The client process may be active in a first computer system, and the server process may be active in a second computer system, communicating with one another over a communications medium, thus providing distributed functionality and allowing multiple clients to take advantage of the capabilities of the server.

Thus, embodiments of the invention can be utilized in a computer network environment having client computers for accessing and interacting with the network and a server computer for interacting with client computers. However, the systems and methods in accordance with embodiments of the invention can be implemented with a variety of network-based architectures, and thus should not be limited to the example shown. Embodiments of the invention can also be utilized in stand-alone computer systems unconnected to a network, in embedded systems, and in any other sort of computer system where accessing backend data is helpful.

Figure 1B:
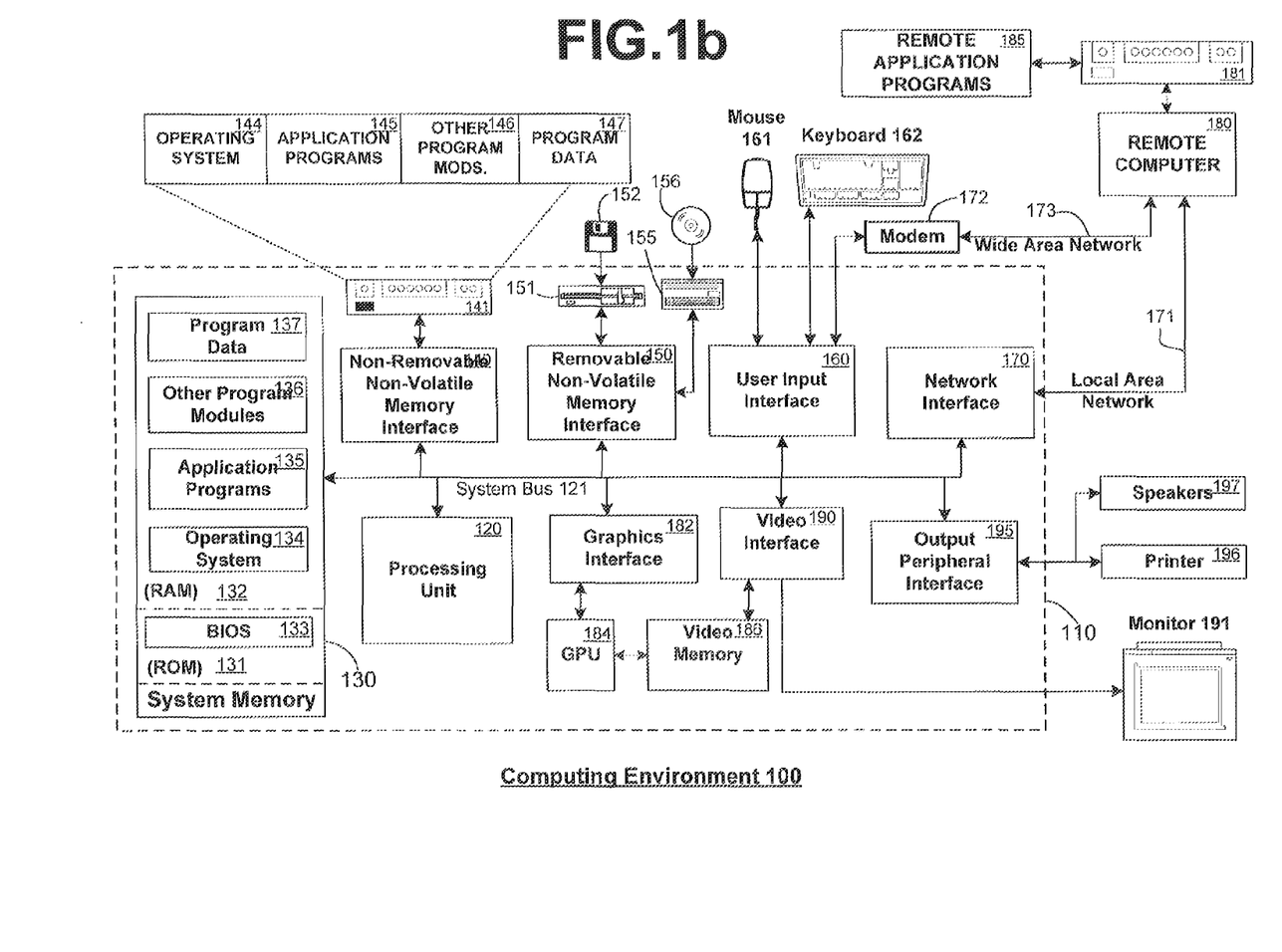
FIG. 1b is a block diagram illustrating an exemplary computing environment in which aspects of the invention may be implemented.

FIG. 1b and the following discussion are intended to provide a brief general description of a suitable computing environment in which the invention may be implemented. It should be understood, however, that handheld, portable, and other computing devices of all kinds are contemplated for use in connection with embodiments of the invention. While a general purpose computer is described below, this is but one example, and only a thin client having network server interoperability and interaction may be required. Thus, embodiments of the invention may be implemented in an environment of networked hosted services in which very little or minimal client resources are implicated, e.g., in a networked environment in which the client device serves merely as a browser or interface to the World Wide Web.

Embodiments of the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, mini-computers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1b thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1b, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1b illustrates operating system 134, application programs 135, other program modules 136, and program data 137.

The computer 110 may also include other removable/non-removable, volatile/nonvolatile computer storage media. By way of example only, FIG. 1b illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1b provide storage of computer readable instructions, data structures, program modules and other data for the computer 110. In FIG. 1b, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1b include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1b illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, embodiments of the invention pertains to any computer system having any number of memory or storage units, and any number of applications and processes occurring across any number of storage units or volumes. Embodiments of the invention may apply to an environment with server computers and client computers deployed in a network environment, having remote or local storage. Embodiments of the invention may also apply to a standalone computing device, having programming language functionality, interpretation and execution capabilities.

Administrator Level Access to Backend Datastores Via Managed Code Functions

Figure 2:
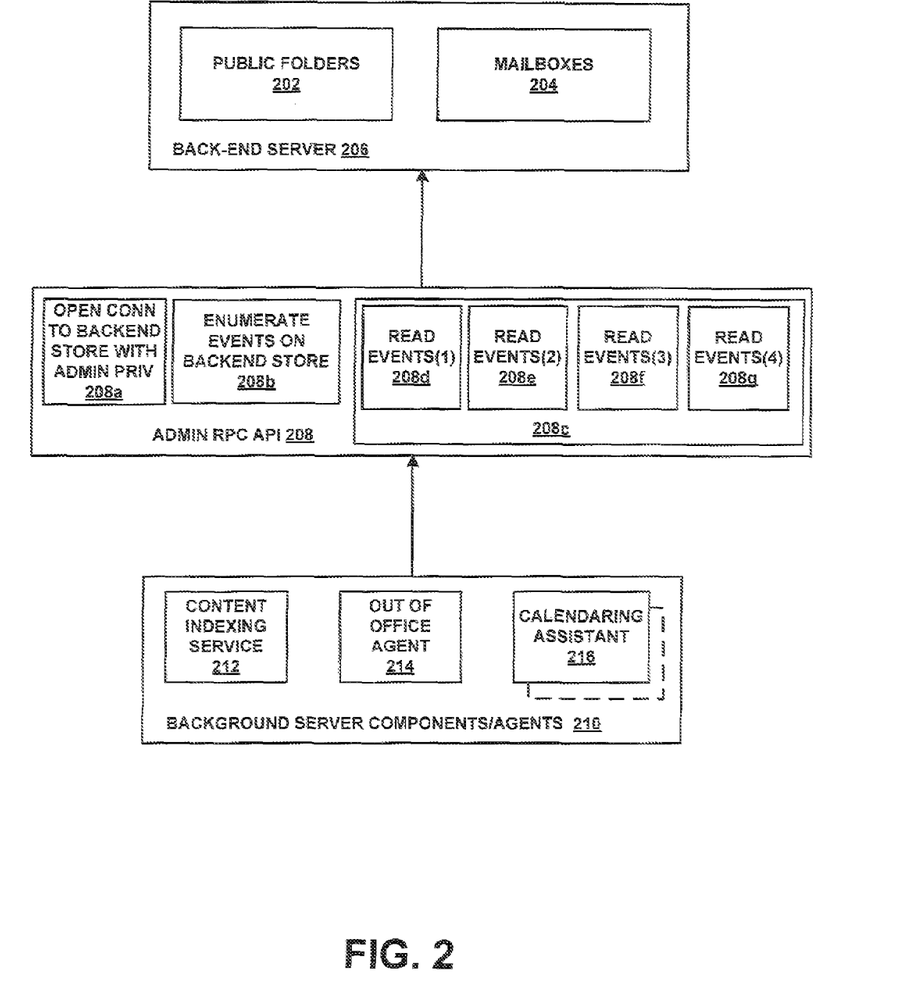
FIG. 2 is a block diagram of a system for accessing backend server data stores in accordance with some embodiments of the invention.

FIG. 2 illustrates an example of one possible system for using administrator level functions of an API written in managed code to access backend data stores. The system may reside on one or more computers such as the one illustrated above with respect to FIGS. 1a and 1b. The computers in the system may be connected via computer and/or telephony networks as described above. The system may include one of more of the following: server components or agents including but not limited to applications such as a content indexing application 212, an out of office application 214, a calendaring assistant application 216, etc. access layer 210 which accesses a set of Administrator level functions of an API 208 (called herein the AdminRPC API) written in managed code that issues RPC calls to a backend server 206 to access data stores (e.g. public folders 202 and mailboxes 204) residing on the backend server 206. The system may also include the backend server 206 itself and its data stores 202 and 204. The backend server 206 may have functions that are exposed through a remote procedure call component that enables components such as a content indexing application 212, an out of office assistant application 214, a calendaring assistant application 216, etc. to make remote procedure calls to the server 206. A remote procedure call allows a call to be made from one computer to another computer where the calling computer requests the called computer to perform some action or execute some operation for the calling computer. In some embodiments of the invention, the data stores 202 and 204 combine voice messaging, fax and email messaging into a unified data store accessible from a telephone and/or a computer.

In accordance with embodiments of the invention, applications 210 may include any number of services typically (although are not limited to) running in background. The applications 210 typically need to be aware of asynchronous changes transpiring in one or more of the backend datastores and thus may periodically poll the backend datastore(s). In some embodiments of the invention, an application issues RPC function calls via the AdminRPC API 208 to establish a connection to the required datastore on the backend server, to create an event manager object to enumerate events occurring on the backend datastore and to read the events enumerated by the event manager object. If an overloaded function is used, which of the signatures to use is determined by the parameters provided. The RPC call may then be issued to the appropriate backend store. The CLR allows an application to perform only those operations that the application has permission to perform. The runtime uses permissions based on Access Control Lists (ACLs) to implement its mechanism for enforcing restrictions on managed code. Upon determining that the application issuing the AdminRPC has the appropriate administrator level privileges, the requested access is granted.

The AdminRPC API may include one or more of the following methods: ExRpcAdmin.Create, 208a, MapiEventManager.Create, 208b, and MapiEventManager. ReadEvents, 208c. It will be appreciated that the names of the API, functions and parameters are only example names and do not limit the contemplated invention to these or any other particular names. In object-oriented programming, the term method refers to a piece of code that is exclusively associated either with a class (called a class method or static method) or with an object (called an instance method). A method usually includes a sequence of statements to perform an action, a set of input parameters to customize those actions, and possibly an output value (called a return value) of some kind. The purpose of a method is to provide a mechanism for accessing (for reading, writing or reading and writing) the private data stored in an object or a class.

The ExRpcAdmin.Create method in some embodiments of the invention is associated with the class, ExRpcAdmin and is used to create a type of connection to a datastore on a backend server that is granted Administrator level privileges. The method receives parameters including:

server, which refers to the server on which the backend server datastore to which the connection is desired is located user, domain and password, which are the user's identifier, domain and password if the application is running as a user. If user, domain and password are null, then the application is running as a system application. When the call reaches the backend store, a check is made to determine if the user has the required access privileges (for example, using ACLs) using a normal system access check call. If the user does not have the required access privileges, the connection is denied. If the user does have the required access privileges, the method returns a connection to the indicated datastore with administrator level privileges. Once the administrator level connections is made, other administrator level access requests can be made to access the datastore using the connection.

The MapiEventManager.Create method in some embodiments of the invention is associated with the class, MapiEventManager and is used to create an Event Manager object which can be used to enumerate events or changes that happen on a specified backend server database. This action represents one of many types of administrator level actions that can be performed using the admin level connection established by the ExRpcAdmin.Create method call. The event manager class is the class based on which the agent can read the events that are occurring on the datastore. The method receives parameters which can include all or a subset of the following:

exRpcAdmin of type ExRpcAdmin, the connection that was created by the ExRpcAdmin.Create method call described above, consumerGuid of type Guid, the globally unique identifier (GUID) of the agent which is making the method call, (e.g., each of the content indexing service, out of office assistant, calendaring assistant, etc. its own GUID)

mdbGUID of type Guid, the GUID of the database on the backend store that the event manager object is to operate on mdbVersionInfo of type byte[ ], the version of the datastore. Different versions of the datastores (which may correspond to different versions of the mail server software) may have different functionality. For example, a new piece of information may be stored in the database in a newer version of the messaging software that is not present in an older version of a database used by an earlier version of the messaging software.

If a call to the MapiEventManager.Create method succeeds, a handle to the MapiEventManager object is returned. Two overloaded method signatures (alternate forms of the function) may exist, one in which mdbVersionInfo is received and the appropriate event manager object for the provided version is returned, such as:

internal static MapiEventManager Create(ExRpcAdmin exRpcAdmin, Guid consumerGuid, Guid mdbGuid, byte[ ] mdbVersionInfo);

and one in which mdbVersionInfo is not received, such as:

```
internal static MapiEventManager Create(ExRpcAdmin
    exRpcAdmin, Guid consumerGuid, Guid mdbGuid);
``` in which case version information is not needed or used.

The MapiEventManager.ReadEvents method is used to read events that occur on a specified backend server database and if successful, returns a data array of events (MapiEvent [ ]) occurring on the specified backend server database. That is, for example, using this function, a calendaring assistant application can read the events occurring in the specified data store. There may be a number of overloaded method signatures. The MapiEventManager.ReadEvents method is of class MapiEventManger and receives some combination of the following parameters:

startCounter of datatype long integer. Each event is assigned a unique event counter. This parameter refers to an event counter starting at which the information is returned. In some embodiments of the invention, startCounter is a 64 bit number. For example, an application may have already read events 1-100 and request events starting at 101 by sending startCounter=101 eventCountWanted of datatype integer. This parameter refers to a number of events to be read and returned to the caller. Selection of an appropriate number of events for eventCountWanted prevents the calling application from being overwhelmed by too much data at once. If, for example, eventCountWanted=100 but there are only 75 events after startCounter, then 75 events would be returned. If eventCountWanted=100 and there are 175 events after startCounter in the datastore, 100 events would be returned, starting at startCounter.

flags is of type ReadEventFlags a collection of flags. This parameter provides the calling application a way to request only certain types of events (such as read message events, for example). Only events of this type are returned in the data array MapiEvent [ ].

eventCountToCheck of type integer. This parameter limits the work that the server performs if there are very few events that match the restriction. For example, if a calling application asks for events starting with counter 1 and there are only 3 events that match the filter restriction, server may need to spend a lot of time to traverse the entire event history. This parameter tells the backend data store to limit its scan of the Events-table to [eventCountToCheck] events and return the matching events (as per the Restriction, which is the next parameter); even if the number of such matching events is less than eventCountWanted.

filter of type Restriction is another way to specify a type of events to return. For example, the filter may provide the calling application a way to receive only emails sent from a specified user. The restriction applies only to events returned: it does not affect what operations a calling application can do. Supported restrictions include:
1) Events with event type mask matching one of the bits specified by restriction
2) Events are from a specific mailbox
3) Combination of #1 and #2,
endCounter is a parameter that is returned to the caller. It is of type long integer and refers to the counter associated with the last event read. For example, a calling application specified a startCounter of 100, eventCountWanted=80 and there are 300 total events (events 1 to 300), in the specified database, endCounter returned would be 180. Similarly if a calling application specified a startCounter of 100, eventCountWanted=80 and there are 160 total events (events 1 to 160), in the specified database, endCounter returned would be 161.

Unsafe is a managed code concept that allows advanced programmers to invoke advanced functionality which is not safeguarded by the normal managed code safeguards. The following information may be returned for each MAPI event:

Read-only long eventCounter of datatype long integer is the counter associated with the event.

Read-only MapiEventTypeFlags eventMask of datatype MapiEventTypeFlags is a flag indicating what kind of event it is. Types of events include:
TABLE-US-00002   CriticalError=0x00000001, NewMail=0x00000002, ObjectCreated=0x00000004, ObjectDeleted=0x00000008, ObjectModified=0x00000010, ObjectMoved=0x00000020, ObjectCopied=0x00000040, SearchComplete=0x00000080,
TableModified=0x00000100,
StatusObjectModified=0x00000200,
MailSubmitted=0x00000400, Extended=unchecked((int) 0x80000000), MailboxCreated=0x00000800,
MailboxDeleted=0x00001000,
MailboxDisconnected=0x00002000,
MailboxReconnected=0x00004000,
MailboxMoveStarted=0x00008000,
MailboxMoveSucceeded=0x00010000,
MailboxMoveFailed=0x00020000, Read-only mailboxGuid of type GUID is a unique identifier for the user mailbox. Read-only objectClass of type string is the class the event belongs to, (for example, there may be different classes for inbox messages, calendar folders, etc.). Read-only createTime of datatype DateTime is when the event occurred. Read-only itemType of datatype ObjectType is the type of object the event is; (for example, an inbox message, a calendar folder, etc.).

Read-only itemEntryId of a datatype comprising a number of bytes is an identifier assigned to an entry. For example, when an inbox folder is opened, each of the emails in the inbox folder has an item entry number which is used to actually open that particular email.

Read-only parentEntryId of a datatype comprising a number of bytes referring to the entry id number of the parent (e.g., the folder in the above example). Read-only oldItemEntryId of a datatype comprising a number of bytes, if for example the item has been moved (e.g., an email that was EntryId=1 was moved to a new folder where it now has EntryId=2, oldItemEntryId saves the EntryId=1 value).

Read-only oldParentEntryId of a datatype comprising a number of bytes, if for example the folder containing the item has been moved (e.g. an folder with ParentEntryId=1 was moved and now a new ParentEntryId=2, oldParentEntryId saves the ParentEntryId=1 value).

Read-only itemCount of datatype long integer is a count of how many items are in a folder.

Read-only unreadItemCount of datatype long integer is a count of how many items are unread in a folder.

The following are four contemplated overloaded signatures (alternate forms of the function) for this method. ReadEvent(1) 208*d*:

```
internal unsafe MapiEvent[ ] ReadEvents(long startCounter,
    int eventCountWanted);
```

This function receives a startCounter and an eventCountWanted and returns a data array. ReadEvent(2) 208*e*:

```
internal unsafe MapiEvent[ ] ReadEvents(long startCounter,
    int eventCountWanted, ReadEventsFlags flags);
```

This function receives a startCounter and an eventCount-Wanted and returns a data array including only events of the type indicated by the flags parameter. ReadEvent(3) 208*f*:

```
internal unsafe MapiEvent[ ] ReadEvents(
    long startCounter,
    int eventCountWanted,
    int eventCountToCheck,
    Restriction filter,
    out long endCounter);
```

This function receives a startCounter and an eventCount-Wanted and returns a data array filtering out all those events indicated by the filter parameter. ReadEvent(4) 208*g*:

```
internal unsafe MapiEvent[ ] ReadEvents(
    long startCounter,
    int eventCountWanted,
    int eventCountToCheck,
    Restriction filter,
    ReadEventsFlags flags,
    out long endCounter);
```

This function receives a startCounter and an eventCount-Wanted and returns a data array including only events of the type indicated by the flags parameter with the events indicated by the filter parameter filtered out.

Figure 3:
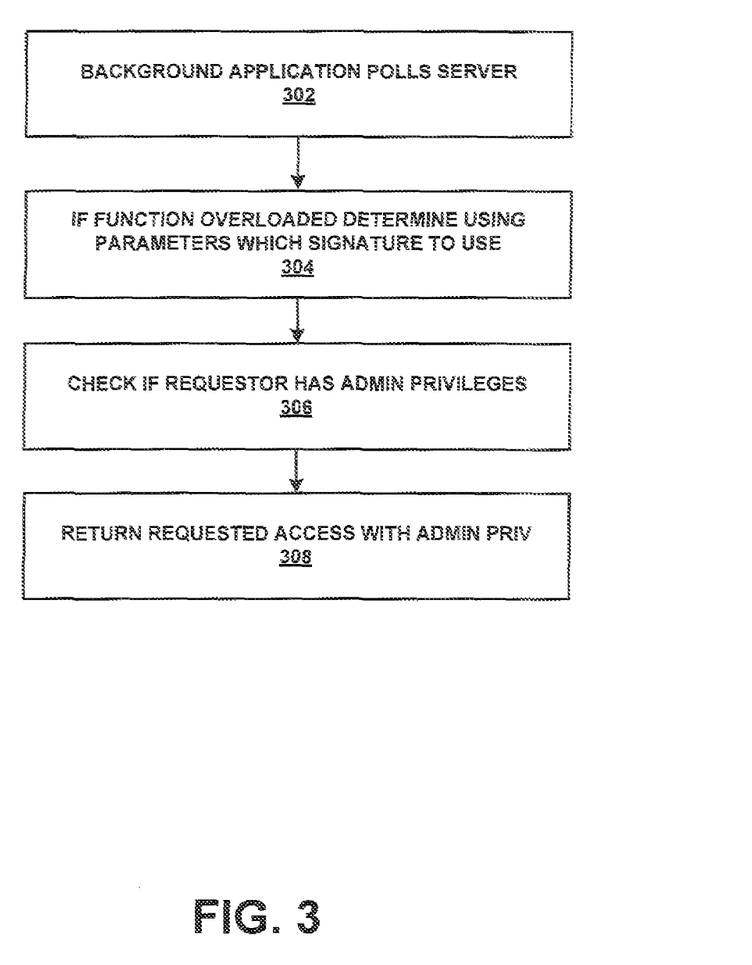
FIG. 3 is a flow diagram of a method for accessing backend server data stores in accordance with some embodiments of the invention.

FIG. 3 is a flow diagram for accessing backend server data according to some embodiments of the invention. In FIG. 3, at 302 a background application running in the messaging server periodically polls a backend store, making a request for administrator level access to a backend datastore using one of the administrator level functions in the AdminRPC API. The backend store may be a mailbox database or a public folder database. If the indicated function is overloaded, at 304, the appropriate function call to make is determined by examining the available input parameters. Execution of the function results in the issuance of an RPC call in native code to the backend server. At 306, when the call reaches the backend server, a system access check is made to determine if the application making the request has administrator level privileges. In some embodiments of the invention, a security component within the runtime assesses access privileges using permission objects and ACLs. The application may be running as a user or may be running as a system application. If the application is running as a user, the user's username, domain and password may be used as credential information to make this check. If the application is running as a system application, a system access check is made. Applications running under a LocalSystem account are always granted administrative rights on databases. If the application does not have the appropriate privileges, the administrator level access to the datastore is not granted. At 308, if the application does have the required access privileges, then the desired access having administrator level privileges is returned to the application.

Figure 4:
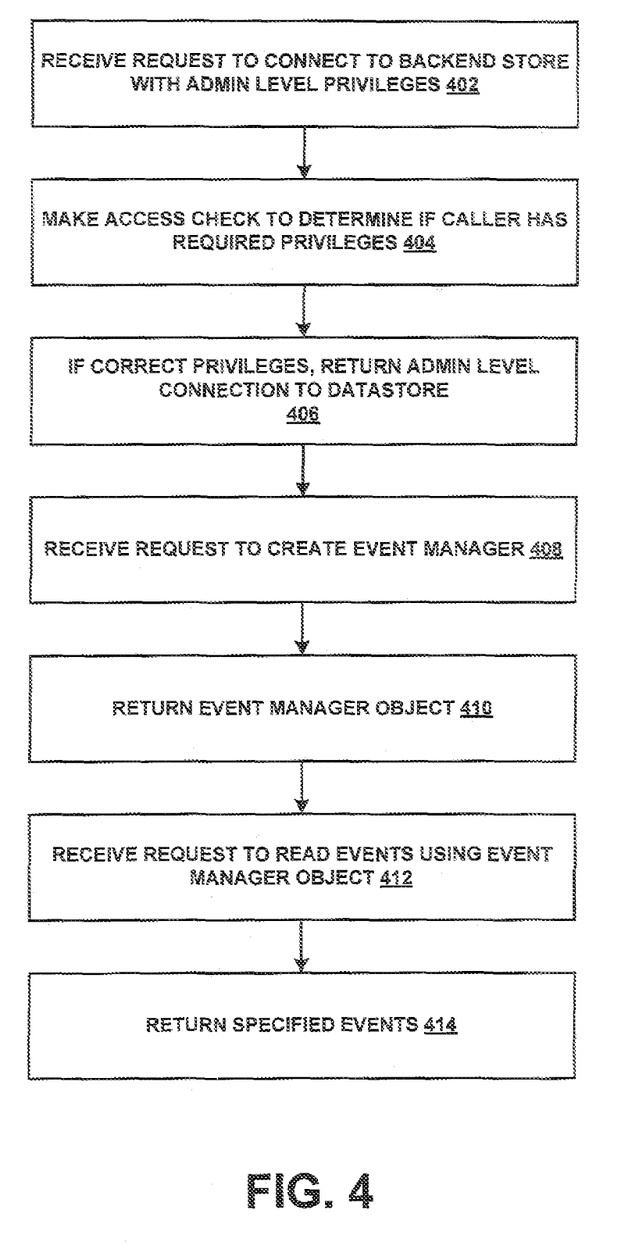
FIG. 4 is another flow diagram of a method for accessing backend server data stores in accordance with some embodiments of the invention.

FIG. 4 is another flow diagram for accessing backend server data according to some embodiments of the invention. In some embodiments of the invention, applications running in background, as described above, periodically poll a datastore on a backend server to determine events transpiring on the datastore. Initially, in order to be able to keep abreast of changes occurring to the database, the application has to establish a connection to the appropriate store on the backend server. Thus, referring now to FIG. 4, at 402 a background application running in the messaging server makes a request to open an administrator level connection to a backend datastore using one of the administrator level functions in the AdminRPC API (e.g., EcRpcAdmin.Create). The backend store may be a mailbox database or a public folder database. The application may be running as a user or may be running as a system application. At 404 a system access check is made to determine if the application making the request has administrator level privileges. If not, the connection is not made to the server. If the application does have the required access privileges, the method returns a connection to the indicated datastore with administrator level privileges at 406. Once the administrator level connections is made, other administrator level access requests can be made to access the datastore using the connection.

At 408 the application may make another AdminRPC function call using the connection returned at 406. Contemplated function calls include the MapiEventManager.Create function described above. If a function call to an overloaded method is made, the appropriate function call to make is determined by the parameters passed to the function. For example, if a function call to the MapiEventManager.Create is made and mdbVersionInfo is provided, the first method signature for MapiEventManager.Create may be used. Similarly, if mdbVersionInfo is not provided, the second method signature for MapiEventManager.Create may be used.

At 410, a handle to the MAPI event manager may be returned to the application. At 412, the event manager object may be used to read events, using the overloaded Read Events function described above. For example, if a function call to the MapiEventManager.Create is made and mdbVersionInfo is provided, the first method signature for MapiEventManager.Create may be used. Similarly, if mdbVersionInfo is not provided, the second method signature for MapiEventManager.Create may be used. If a filter parameter but no flags parameter is passed, ReadEvent(3) is used. If a filter parameter and a flags parameter is passed, ReadEvent(4) is used. At 408, the function call is made and the requested information returned to the calling application. The appropriate STOREPROVIDER function call with the appropriate input parameters for the function call gleaned from the initial request is sent to the backend server. Execution of the function results in the issuance of an RPC call in native code to the backend server.

At 414, the backend server returns information to the application concerning the events read.

The various techniques described herein may be implemented in connection with hardware or software or, where appropriate, with a combination of both. Thus, the methods and apparatus of embodiments of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of embodiments of the invention, e.g. through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While embodiments of the invention have been described in connection with the figures, it is to be understood that other similar embodiments may be used or modifications and additions may be made to the described embodiments for performing the same functions without deviating therefrom. Therefore, the invention should not be limited to any single embodiment, but rather should be construed in breadth and scope in accordance with the appended claims.

What is claimed:

1. A computer-implemented method of data access to a specified mail server, comprising:
    a computer receiving a remote procedure call (RPC) generated from a function call issued by an application written in managed code running in background on the specified mail server, wherein the function call requests administrator-level access to the specified mail server, the function call based upon the application periodically polling one or more of a plurality of backend data stores of the specified mail server; and
    in response to receiving the function call, the computer making a function call to an administrator level applications programming interface written in managed code and comprising a plurality of functions, wherein execution of the function call to the administrator level applications programming interface results in issuing an RPC call to the specified mail server to provide an administrator level connection to the specified mail server and the applications programming interface returning administrator access to the specified mail server in response to determining that the application has administrator level access privileges.

2. The method of claim 1, wherein at least one of the plurality of backend data stores is a mailbox or a public folder.

3. The method of claim 1, wherein the function call from the application includes a request for a connection to the specified mail server, wherein input parameters provide access credentials of the requesting background application and the specified mail server and wherein the called function returns an administrator level connection to the specified mail server in response to determining that the credentials provide administrator level privileges.

4. The method of claim 1, wherein the function call from the application includes a request for creation of an event manager that enumerates events occurring on a data store of the plurality of backend data stores on the specified mail server, the events comprising changes that transpire on the data store, wherein input parameters provide an administrator level connection to the specified mail server, a unique identifier associated with the requesting background application, a unique identifier associated with the specified data store and wherein the called function returns a handle to an event manager object.

5. The method of claim 1, wherein the function call from the application includes a request for creation of an event manager that enumerates events occurring on a specified version of a data store on the specified mail server, wherein input parameters provide an administrator level connection to a data store of the plurality of backend data stores, a unique identifier associated with the requesting background application, a unique identifier associated with the data store and an identifier of the specified version and wherein the called function returns a handle to an event manager object.

6. The method of claim 1, wherein the function call from the application includes a request to read events enumerated by an event manager that enumerates events occurring on a specified data store on the specified mail server, the events comprising changes that transpire on the specified data store, wherein input parameters provide an event counter of an event to start reading at and a number and type of events to read and wherein the called function returns events of the designated type starting at the event counter.

7. The method of claim 6, wherein an input read event parameter flag identifies a type of event to read and wherein the called function returns events of the type specified by the input parameter flag.

8. The method of claim 6, wherein an input filter parameter identifies a type of event to exclude and wherein the called function filters out events identified by the input parameter.

9. A computer-readable storage medium comprising:
    computer-readable instructions stored on the computer-readable medium for receiving an RPC call generated from a function call issued by an application written in managed code running in background on a mail server, wherein the function call requests administrator level access to the mail server, the function call based on the application periodically polling one or more of a plurality of backend data stores of the mail server; and
    computer-readable instructions stored on the computer-readable medium for making a function call to an administrator level applications programming interface written in managed code and comprising a plurality of functions, wherein execution of the function call to the administrator level applications programming interface results in issuing an RPC call to the mail server to provide an administrator level connection to said mail server and the applications programming interface returning administrator level access to the mail server in response to determining that the application has administrator level access privileges.

10. The computer-readable storage medium of claim 9, comprising further computer-readable instructions for:
    returning an administrator level connection to a specified mail server in response to determining that the function call to the administrator level applications programming interface comprises a request to open the administrator level connection to the mail server and the administrator level connection to the specified mail server is returned to the application.

11. The computer-readable storage medium of claim 10, comprising further computer-readable instructions for:
    receiving a first function call comprising the request to open the administrator level connection to the mail server and a second function call comprising a function call requesting creation of an event manager that enumerates events occurring on a specified data store using the administrator level connection to the mail server, the events comprising changes that transpire on a specified backend data store of the plurality of backend data stores of the mail server; and
    returning a handle to the event manager to the application.

12. The computer-readable storage medium of claim 10, comprising further computer-readable instructions for:
    receiving a first function call comprising the request to open the administrator level connection to the mail server and a second function call comprising a function call requesting creation of an event manager that enumerates events occurring on a specified version of a specified data store using the administrator level connection to the mail server; and returning a handle to the event manager to the application.

13. The computer-readable storage medium of claim 12, comprising further computer-readable instructions for:

receiving a third function call comprising a function call reading the enumerated events returned by the event manager and wherein input parameters to the third function call comprise a starting counter at which events are read and a number and type of events to read; and returning events of the designated type beginning at the starting counter.

14. The computer-readable storage medium of claim 12, comprising further computer-readable instructions for:

receiving a third function call comprising a function call reading the enumerated events returned by the event manager and wherein input parameters to the third function call comprise a starting counter at which events are read, a number and type of events to read and a specified type of events to return; and returning events beginning at the starting counter of the specified type of events.

15. The computer-readable storage medium of claim 12, comprising further computer-readable instructions for:

receiving a third function call comprising a function call reading the enumerated events returned by the event manager and wherein input parameters to the third function call comprise a starting counter at which events are read, a number of events to read and a specified type of events to exclude; and returning events beginning at the starting counter of the specified type of events, excluding the specified type of events to exclude.

16. The computer-readable storage medium of claim 12, comprising further computer-readable instructions for:

receiving a third function call comprising a function call reading the enumerated events returned by the event manager and wherein input parameters to the third function call comprise a starting counter at which events are read, a number of events to read, a specified type of events to return and a specified type of events to exclude; and returning events of the specified type of events beginning at the starting counter of the specified type of events, excluding the specified type of events to exclude.

17. A computer-readable storage medium having computer-executable instructions stored thereon for implementing an administrator level applications programming interface written in managed code, said computer-executable instructions comprising:

instructions for implementing a set of functions including:

a first function comprising a request to provide an administrator level connection to a specified backend data store on a specified backend server that is granted administrator level privileges, the request based upon a periodic polling of one or more of a plurality of backend data stores of the specified backend server;

a second function comprising a request to use the administrator level connection to the specified backend server returned from the first function to create an event manager that enumerates events, the events comprising changes that occurred on a specified data store on the specified backend server; and a third function comprising a request to read a specified number of events enumerated by the event manager created by the second function starting at a specified counter associated with the events that occurred on the specified data store.

18. The computer-readable storage medium of claim 17, wherein the second function is an overloaded function wherein in an alternate form of the second function a version number of the specified backend server is specified.

19. The computer-readable storage medium of claim 17, wherein the third function is an overloaded function wherein in a first alternate form of the third function a type of event to read is specified, and wherein in a second alternate form of the third function a type of event to exclude is specified and wherein in a third alternate form of the third function a type of event to read and type of event to exclude is specified.

* * * * *